(12) United States Patent
Ben-Shachar et al.

(10) Patent No.: US 7,685,633 B2
(45) Date of Patent: Mar. 23, 2010

(54) PROVIDING CONSISTENT APPLICATION AWARE FIREWALL TRAVERSAL

(75) Inventors: Ido Ben-Shachar, Kirkland, WA (US); Ashwin Palekar, Sammamish, WA (US); David C. Steere, Bellevue, WA (US); Joy Chik, Sammamish, WA (US); Tudor A. Baraboi, Seattle, WA (US); Meher P. Malakapalli, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/326,992

(22) Filed: Jan. 5, 2006

(65) Prior Publication Data

US 2006/0195899 A1   Aug. 31, 2006

Related U.S. Application Data

(63) Continuation-in-part of application No. 11/067,125, filed on Feb. 25, 2005.

(60) Provisional application No. 60/716,297, filed on Sep. 12, 2005.

(51) Int. Cl.
*G06F 15/16* (2006.01)
(52) U.S. Cl. ...................................................... 726/12
(58) Field of Classification Search ................... 726/12
See application file for complete search history.

(56) References Cited

U.S. PATENT DOCUMENTS 6,101,549 A    8/2000  Baugher et al. ............. 709/238
6,463,475 B1 * 10/2002  Calhoun ...................... 709/227
6,763,395 B1    7/2004  Austin ......................... 709/245
7,272,625 B1 *  9/2007  Hannel et al. ............... 709/200
2002/0165993 A1 11/2002  Kramer
2003/0014528 A1  1/2003  Crutcher et al. ............. 709/229
2004/0107360 A1 * 6/2004  Herrmann et al. ........... 713/201
2005/0044197 A1  2/2005  Lai
2005/0114658 A1  5/2005  Dye et al.
2005/0163079 A1 * 7/2005  Taniuchi et al. ............. 370/331
2006/0168321 A1 * 7/2006  Eisenberg et al. ........... 709/238
2006/0195899 A1  8/2006  Shachar

OTHER PUBLICATIONS

Adam's Mindspace, R2 will have RDP over HTTP Proxy, Jun. 3, 2004.
Office Action dated Aug. 8, 2008 cited in U.S. Appl. No. 11/067,125.
Office Action dated May 1, 2009 cited in U.S. Appl. No. 11/067,125.

* cited by examiner

*Primary Examiner*—Kambiz Zand
*Assistant Examiner*—Aubrey H Wyszynski
(74) *Attorney, Agent, or Firm*—Workman Nydegger (57) ABSTRACT

Implementations of the present invention relate to a communication framework that is readily adaptable to a wide variety of resources intended to be accessible through a firewall. In general, a communication framework at a gateway server can provide a specific connection to a requested resource in accordance with a wide range of resource and/or network access policies. In one instance, a client requests a connection to a specific resource behind a firewall. The communication framework authenticates the connection, and quarantines the connection until determining, for example, that the client is using an appropriate resource features. If appropriately authenticated, the communication framework can pass control of the connection to an appropriately identified protocol plug-in processor, which facilitates a direct connection to the requested resource at an application layer of a communication stack.

17 Claims, 3 Drawing Sheets

PROVIDING CONSISTENT APPLICATION AWARE FIREWALL TRAVERSAL

CROSS-REFERENCE TO RELATED APPLICATIONS

The present invention claims the benefit of priority to U.S. Provisional Patent Application No. 60/716,297, filed on Sep. 12, 2005, entitled "Building Application-Aware Firewall Traversal Solutions." The present invention is also a continuation-in-part of U.S. patent application Ser. No. 11/067,125, filed on Feb. 25, 2005, entitled "Enabling Terminal Services through a Firewall." The entire contents of the aforementioned patent applications are incorporated herein by reference.

BACKGROUND

Background and Relevant Art

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources (e.g., a "device," "application," or "application component") on a network have also increased.

Some current ways for managing resources within a network include centralized computing scenarios, which can involve a centralized gateway server sharing resources with one or more clients that do not have those resources installed locally. One such example involves a centralized gateway server that allows a client computer system to login to the gateway server on a local intranet, or to login through a network firewall. The client computer can then access data and resources of interest through the firewall using a secure connection.

In one firewall example, the client computer system might tunnel through the firewall from a network layer at the client computer system to a corresponding network layer at the server computer system using a Virtual Private Network ("VPN"), Remote Access Server ("RAS"), or other related type of firewall traversal connection. A tunneling firewall-traversal connection such as this generally involves a client using the Secure Hypertext Transfer Protocol ("HTTPS"), which is an HTTP mechanism that exchanges encrypted information using Secure Socket Layer ("SSL") or Transport Layer Security ("TLS") encryption mechanisms, to authenticate at a gateway server. After the gateway server allows passage through the firewall, the client computer system can then access all of the resources behind the firewall, such as by using one or more sockets to interact with a given resource.

With another firewall traversal solution, such as one that connects an application layer at the client with an application layer at the server, the client might also need to call out a protocol processor associated with the resource of interest. A protocol processor in this case is essentially an Application Program Interface ("API"), which is also typically designed by a third-party developer as a plug-in (i.e., a "protocol processor plug-in") to the RPC/HTTPS communication stack. In addition to being configured for communicating with a certain type of resource or application program, the protocol processor plug-in is also typically designed to include certain network policies for using the given resource (or "application"). Thus, upon logging in, and upon passing any required levels of authentication required by the protocol processor plug-in, the client computer system can exchange information with the requested resource at the server computer system. For example, the client may be able to send mouse and keyboard events, which are then relayed to an appropriate resource. The resource then processes those events, and returns the results of this processing to the client for local display.

Unfortunately, despite some of the conveniences that are possible from these different types of traversal solutions, there can be a number of inefficiencies that can make these types of communication difficult to implement from a third-party developer's standpoint. For example, when using a network connection between network layers, rather than application layers, the client may effectively disable local network operations. For example, a connection tunnel made between network layers may disable some types of network resources that would otherwise be available using other types of network connections, such that, for example, the client may be unable to access a local area network printer, a local network-enabled music or video streaming device, or the like.

Another problem is that all Internet traffic is directed through the server computer system to which the client computer system is connected. Thus, if the client is connected to a corporate firewall using a VPN, and the client requests an outside news-based website, the news-based website will be funneled through the corporate firewall before making its way to the client computer system. Still another problem is that VPN/RAS can only do packet-inspection and filtering, which is typically difficult to do on complex or stateful protocols.

Alternatively, problems with application-layer types of connections include the notion that it can be difficult for third-party developers to develop protocol processor plug-ins that can control the application-protocol going through the server gateway at a high-level. In particular, while an application-layer connection might allow the client to connect to other networks simultaneously—since each connection is based on an application identity rather than a network identity—this sort of integration can mean that a developer will also need to create a different protocol processor plug-in for each individual resource or application that the developer(s) would like the client to be able to access. This can result in still further problems since each different protocol processor may also need to include additional, unique access policies. Such access policies might include, for example, how, when, or if a user, or even a class of users, should be allowed to log-in (or access) to a certain resource.

Thus, for example, a developer implementing application-layer connections may write one protocol processor plug-in that uses the Remote Desktop Protocol ("RDP"), which implements one kind of access policy with the gateway server; and, at the same time, write a different protocol processor plug-in that uses a Server Message Block ("SMB") protocol, and which implements still different access policies at the gateway server. In addition to having potentially unique access policies, each protocol processor may also have separate, unique scripts that are used for other various administration and diagnostic tools. Thus, it may often be the case that developers are continually building different plug-ins, network policies, and related diagnostic scripts from the ground up for each of the different resources of interest they would like accessible through a firewall.

This can be a fairly complicated undertaking for developers and network administrators alike, particularly when considering the various code versions that a server and/or resource may undergo during its lifetime. For example, when a client computer system may not have installed certain resource or application features prior to the communication with the server, which features might ensure the communication is not intercepted or somehow otherwise susceptible to corruption. Present security authentication protocols and protocol processor plug-ins, however, do not normally take these sorts of constraints into consideration. Rather, these issues might be dealt with later by the connected resource, which can result in communication errors, and dropped or intercepted connections, and even compromise of the gateway server in the worst case. In particular, present access policy controls do not readily provide granular control to network and/or resource administrators.

Accordingly, there are a number of inefficiencies in current client/server communications that can be addressed.

BRIEF SUMMARY

Implementations of the present invention solve one or more problems in the art with systems, methods, and computer program products configured to provide a standardized platform in which developers can easily provide client/server application connections. In particular, one implementation of the present invention includes a secure communication framework configured to efficiently and securely connect a remote client and any server resource at the application level of a communication stack through a firewall. The communication framework can foster the connection in consideration of a variety of appropriate access policies that do not necessarily need to be independently developed by the developer. In addition, the communication framework can further include certain quarantine functions that can be used to ensure that a client does not connect to a resource without having installed a minimum software patch.

For example, at a gateway server having at least a remote procedure call layer and a secure hypertext transfer protocol layer in a communication framework, a method in accordance with an implementation of the present invention can involve receiving a connection request from a client. Generally, the connection request can identify a resource with which the client would like to connect. The method can also involve quarantining a connection with the client to determine if the client supports a minimum set of features. In addition, the method can involve identifying a protocol processor plug-in based on a resource type of the identified resource, and forwarding the connection with the client to the identified protocol processor plug-in.

In addition, at a client computer system where the client accesses a resource through a gateway server firewall, a method in accordance with an implementation of the present invention can involve sending a request for a connection at a gateway server. Generally, the request can identify a server resource to connect with a corresponding client resource. The method can also involve receiving a request from the gateway server for a minimum set of features available at the client resource. In addition, the method can involve sending a version response to the gateway server, where the response indicates the set of supported features at the client. Furthermore, the method from the client perspective can involve connecting to an application layer of a communication stack at the gateway server. As such, the client resource can communicate data with a protocol processor plug-in associated with the server resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to provide a standardized platform in which developers can easily provide client/server application connections. In particular, one implementation of the present invention includes a secure communication framework configured to efficiently and securely connect a remote client and any server resource at the application level of a communication stack through a firewall. The communication framework can foster the connection in consideration of a variety of appropriate access policies that do not necessarily need to be independently developed by the developer. In addition, the communication framework can further include certain quarantine functions that can be used to ensure that a client does not connect to a resource without having installed a minimum software patch.

As a result of these and other features, a communication framework in accordance with aspects of the present invention simplifies the ability to extend point-to-point application protocols, and thereby leverage gateways. For example, aspects of the present invention allow for client exposure to application-aware protocol processor plug-ins at a gateway server, which in turn can provide specific governance over how, when, and by whom certain resources can be accessed. Since much of the access policy is included in the communication framework, granular configuration and pass-through policies can be easily implemented by a protocol processor plug-in developer, and make development of protocol processor plug-ins much simpler and more efficient. Furthermore, a communication framework in accordance with aspects of the present invention can ensure that only clients that support certain features can tunnel through the gateway server firewall in the first instance, and ultimately establish a channel to a resource.

As a preliminary matter, the schematics and flowcharts described herein make reference to a number of Application Program Interfaces ("API") that can be used in accordance with aspects of the present invention. The number of APIs that can be used with a communication framework from the client side and gateway server side can vary with any implementation. For example, in one implementation, there might be at least two client APIs, and at least four gateway server APIs.

From the client side, for example, one client API can include a "core API," which allows client protocol processor plug-ins to create and find tunnels, create channels, and send traffic to resource servers. The core API can also include additional APIs for gathering non-default credentials in accordance with resource access policies. A second client API can include a "configuration API." The configuration API can allow client protocol processor plug-ins to store and load configuration information for connecting to gateway servers (e.g., gateway server name, authorization type, etc.) and to control client adapter behavior.

From the server side, one gateway server API can also include a "core API," which allows gateway server protocol processor plug-ins to service client request to create channels and to forward traffic from the client to the gateway server and vice versa. A second API, also a "configuration API," can provide a common store for server protocol persistent data. A third API, a "policy API," can provide an interface to the network and resource access policies, which gateway server protocol processor plug-ins might use to determine if the user is authorized to connect to a particular resource server during channel creation. A fourth API, a "runtime status and control API," can allow administration tools on the edge to monitor usage and make changes to runtime state, such as shutting down tunnels belonging to misbehaving users.

Figure 1A:
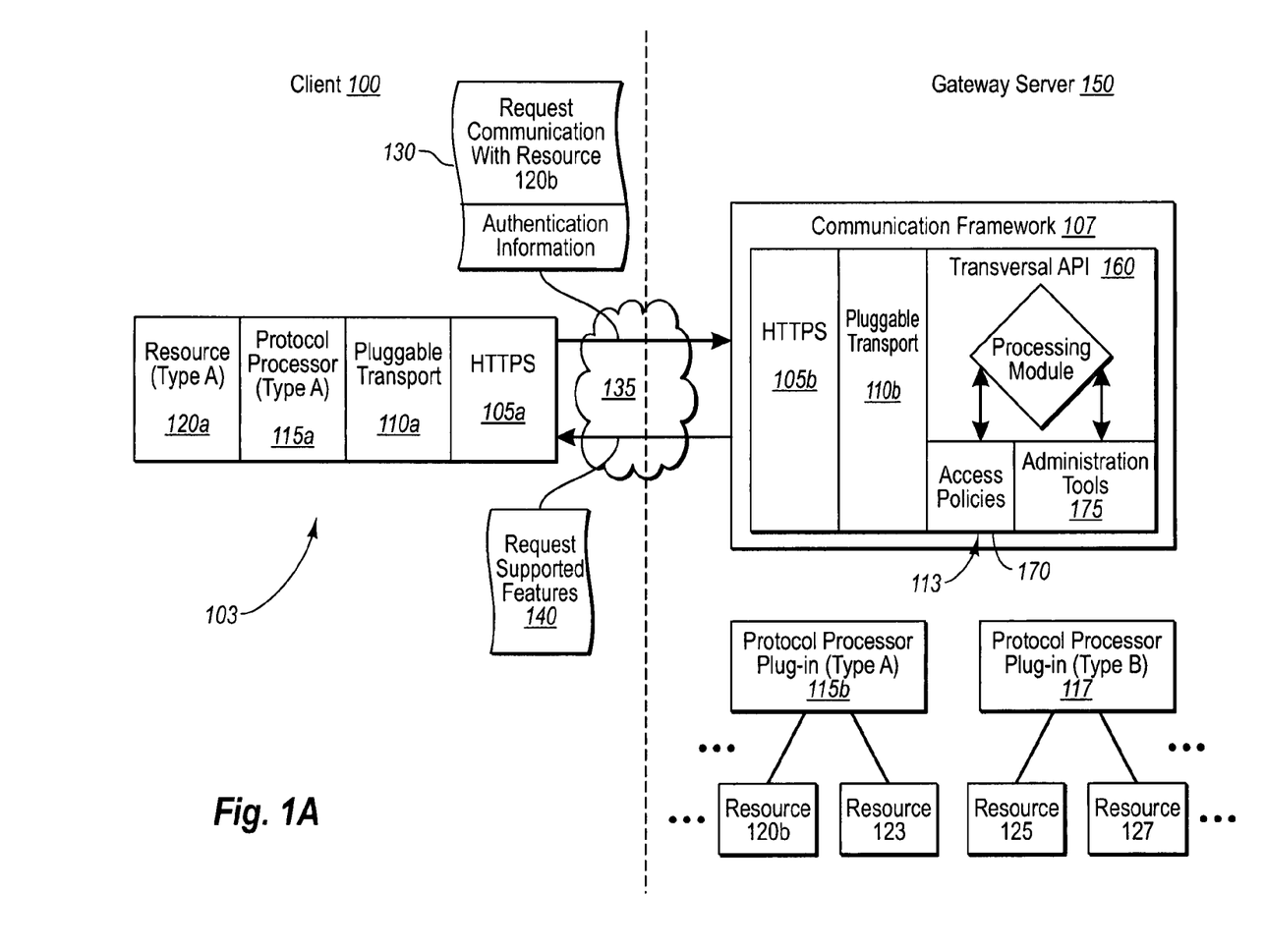
FIG. 1A illustrates an overview schematic diagram of a system in which a client computer system communicates with a gateway server communication framework pursuant to traversing a firewall in accordance with an implementation of the present invention.

These are examples of specific types of APIs that can be used in accordance with the general principles of the invention. The functions of these APIs are discussed with general reference in the following Figures. For example, FIG. 1A illustrates a schematic overview of an implementation of the present invention in which client computer system 100 attempts to communicate with a specific resource (e.g., application or related component) located behind a firewall at gateway server 150. For this communication to occur, client 100 and gateway server 150 will ultimately use a similarly configured protocol processor plug-in (e.g., 115a-b), which comprises a set of APIs (e.g., above) that can communicate and or operate within the context of communication framework 107 (i.e., "plug-in" to the framework).

As will be understood more fully from the following specification and claims, communication framework 107 is a feature-rich data structure (e.g., including the four APIs mentioned above) that includes a variety of components, processing modules, tools, indexes, or the like. Generally, communication framework 107 is designed and/or configured such that a developer can easily design a protocol processor plug-in (e.g., 115a-b, 117) that interfaces with communication framework 107, and uses the features and policies provided in communication framework 107 without having to separately develop or write these features and policies.

In particular, FIG. 1A shows that communication framework 107 comprises a communication stack 113, which is used for interfacing between the physical boundary at network 135 and various software components at gateway server 150. Generally, gateway server 150 can comprise any network edge server, such as a fire-walled Internet server of a large organization, through which pass all inbound and outbound Internet traffic. For example, a worker in an organization that desires to connect from a home office location to a resource at an office location will connect through gateway server 150 before accessing a resource behind the firewall.

As such, communication framework 107 can include any number of components and modules for interfacing with resources behind a firewall that can be used to access a specific resource. For example, FIG. 1A shows that an implementation of communication stack 113 at communication framework 107 comprises a secure Hypertext Transfer Protocol ("HTTPS") layer 105b, as well as a pluggable transport layer 110b. In one implementation, pluggable transport layer 110b (as well as layer 110a) is a Remote Procedure Call ("RPC") layer 110b, such that layer 105a-b and layer 110a-b may also be referred to together as "HTTPS/RPC". When used as such, HTTPS layer 105b decrypts or decodes any SSL or TLS encryption/encoding, while pluggable transport layer 110b unpacks any wrapping (e.g., RPC) made at corresponding pluggable transport layer 110a at client 100.

Of course, there can be any number of additional or alternative layers included in communication stack 113, which may be part of or correlate with the traditional 7-layer Operating System Interconnect ("OSI") model. For example, although the HTTPS/pluggable transport layer 105b/110b is shown for simplicity as a minimum set of layers in this implementation, it is not the only way to accomplish aspects of the invention. In other implementations, for example, a developer may dispense with HTTPS, and use another connection mechanism based on an SSL and/or Transmission Control Protocol ("TCP") solution that also connects client and gateway application layers through a secure connection. Hence, an HTTPS/pluggable transport, particularly an HTTPS/RPC set, is only one possible way of providing firewall-traversal solution elements.

Notably, one advantage of HTTPS and a pluggable transport layer such as RPC is that some protocols, such as RPC, are backwards compatible with earlier versions of HTTP (e.g., HTTP version 1.0). Thus, a developer using an HTTPS/RPC set may find that this element of a firewall-traversal solution can be employed more readily at older servers, or in servers that limit types of traffic to the more common HTTP-type of traffic.

In any event, FIG. 1A also shows that traversal Application Interface ("traversal API") 160 is layered on top of the HTTPS/pluggable transport bundle of stack 113. Traversal API 160 can comprise any number of components and modules (e.g., one or more of "core API," "configuration API," "policy API," and/or "runtime status and control API," mentioned above) for creating an appropriate connection between client 100 and an appropriate protocol processor plug-in, and for ensuring appropriate network policies are implemented in the connection. For example, traversal API 160 includes an access policies component 170 (e.g., "policy API"), and an administration tools component 175 (e.g., "configuration API," and/or "runtime status and control API"), which can be referenced for a number of functions discussed in more detail hereinafter. More generally, however, traversal API 160 can act as a shim between the HTTPS/pluggable transport bundle in communication stack 113 and one or more protocol processor plug-ins that are used to communicate with a specific resource.

For example, FIG. 1A shows that gateway server 150 also includes at least protocol processor plug-ins 115b and 117. Generally, a protocol processor plug-in is an interface developed by a third-party developer, which is capable of interacting within the confines of communication framework 107 on one end, and passes data received through communication framework 107 to a specific resource on the other end. In addition, a protocol processor plug-in can be defined in terms of a "type" of plug-in related to a resource, or class of resources. For example, a set of office applications that interact through a common interface might constitute one type of application, while a database program that interacts through a different interface might constitute a different type of application or resource. In addition, hardware, such as printers or disk drives might constitute still other resources that have other types of interfaces for communicating. As such, a developer that provides a resource may also write a unique protocol processor plug-in for that given resource.

The developer, however, will also need to provide a corresponding protocol processor plug-in for the client, so that the client can communicate with a requested resource. Thus, for example, FIG. 1A also shows that client 100 has communication stack 103, which also includes an HTTPS layer 105a and pluggable transport layer 110a. Generally, pluggable transport layer 110a is used to wrap any outgoing messages (e.g., 130) in accordance with an appropriate protocol (e.g., the RPC protocol when using an RPC layer), while HTTPS layer 105a is used to encrypt or encode outgoing messages, such as with SSL or TLS encryption or encoding. Layered on top of the client's HTTPS/pluggable transport bundle is protocol processor plug-in 115a.

Generally, protocol processor plug-in 115a comprises any interfaces (e.g., "core API," and/or "configuration API"), resources or components necessary to create a connection tunnel, and corresponding channel (inside the tunnel) with an appropriate resource at gateway server 150. Accordingly, protocol processor plug-in 115a is at least complementary with protocol processor plug-in 115b. For example, FIG. 1A shows that protocol processor plug-in 115a is of a certain type (i.e., "Type A"), corresponding to a type of resource (i.e., resource 120a) client 100 is using locally, and thus is able to communicate with the complementary protocol processor plug-in using the same calls, encoding, and so forth.

Along these lines, FIG. 1A further shows that communication stack 103 includes a resource 120a (e.g., an application program, a component, or even another API). For example, client opens up a database application on a local computer system that is synchronized with a working version of the database located behind the firewall at gateway server 150. While resource 120a may be a full version of an application in some cases, resource 120a may also simply be a software component of an application that allows data streamed from gateway server 150 to be displayed in a certain way. Components such as resource 120a, therefore, provide a minimal set of resources in this case that enable client 100 to connect directly with a resource at gateway server 150.

For example, FIG. 1A shows that client 100 requests 130 a connection with a resource 120b using resource 120a. To do so, client 100 initiates communication stack 103 having an appropriate protocol processor plug-in (i.e., 115a), which is an appropriate type (i.e., "Type A") for the desired resource (i.e., resource 120a). Client 100 then sends connection request message 130 to gateway server 150 through communication stack 103. In particular, protocol processor plug-in 115a prepares outgoing message 130 with authentication information (e.g., user name and password, client identification, digital signatures), a specific call to resource 120b, and any network policy information that that might be required at traversal API 160. Protocol processor plug-in 115a then sends message 130 to be packaged at pluggable transport layer 110a, encrypted at HTTPS layer 105 (i.e., via TLS or SSL), and then sent over network 135.

Communication framework 107 then receives message 130, and performs the initial unpacking and decrypting functions. For example, HTTPS layer 105b decrypts any SSL or TLS encoding, and pluggable transport layer 110b unpacks the message from any appropriate encoding (e.g., RPC encoding). Traversal API 160 can then examine authentication information in message 130, and determine if client 100 is authorized for the requested connection based on fairly granular access policies. In one implementation in particular, the granularity of the access policy is based on differentiating the access policies into at least two independent sets: a network access policy for determining whether a client is authorized to make a network connection to server 150 in the first instance; and a resource access policy for determining whether the client is authorized to have a connection channel with a requested resource despite being allowed to create a connection tunnel. Such access policy (network or resource) authorization can be configured to depend on any number of considerations desired by the network and/or application/resource administrator, such as, for example, authenticating traditional user names and passwords, identifying "client health," or the like (e.g., quarantine feature discussed more fully below).

Some examples of network access policies rules include limitations on whether a user at client 100 is part of an authorized group associated with a requested resource. A set of network access policies might also be configured to restrict certain server connections only to a group in a marketing department, limit the number of general server connection tunnels to some maximum number, limit access to a certain server (to times in the day, certain users, etc.) behind the firewall, or even to limit access only to specific ports on the given server. Still other network access policies might be configured to require the client to present a "smartcard" before connecting to server 150.

Along similar lines, a set of resource access policies can be configured to limit the number of connection channels to a resource (though the user has already connected to the server through the firewall), restrict all resources generally, and/or restrict resources and/or connections even to certain groups of users just for a certain number of hours in the day. At least in part since the network access policies and resource access policies can be configured independently with individualized criteria, access policies component 170 can provide a network and/or resource administrator with much more granular control over authentication and access filtration at gateway server 150.

In particular, the two policy classes (i.e., resource access policies and network access policies) can be linked via "levels-of-access," which allow the network and/or application/resource administrator(s) to define and evolve their policies fairly independently, particularly where they agree to a specific set of access-levels between them. For example, a user might be able to access one set of resources at one time of day when providing a particular user name and password, but be unable to access that same set of resources at another time of day without also presenting a smart card. Similarly, the user might be able to access a different set of non-overlapping resources at another time of day, or perhaps over weekend hours, regardless of whether the user presents any form of authentication.

Yet still further, the combination of network and resource access policies can be used to prevent the user from accessing server 150 altogether during one time of day that has a particular limit on the maximum number of connection tunnels at the server; or to connect to a version of a resource behind one internal server but not to a different version of the same resource hosted at another server during a specific time. Of course, this level of granularity of control offered by the independent criteria in the network and resource access policies of access policy component 170 might be modified further by simply changing the user's level of access from a base level to a more administrative-type level of access.

In any event, FIG. 1A also shows that communication framework 107 replies with message 140, requesting any number of one or more features with which, for example, communication framework 107 is configured to communicate. In particular, implementations of the present invention can further include, as mentioned above, a possible quarantine feature as part of a network access policy, in which communication framework 107 ensures that only those clients that have a minimum set of resources or features (e.g., a certain resource versions, sets of protocols or components, software patches, etc.) are allowed to connect to a given server resource.

In alternative implementations, communication framework 107 simply turns off any features that are not supported by client 100, so that the client does not try to communicate at some point with such unsupported features. For example, developer of resource 120b may have provided a number of features or feature updates to this resource, which should not be accessed (or used) by client 100 (or clients within a class of users identified by a resource access policy) unless client 100 also has a minimum set of corresponding, resource(s), feature (s) or feature update(s). These resources, features and/or related feature updates may be functional, but may also be security related, and so may be important for the developer to enforce. Accordingly, in one implementation, communication framework 107 can simply place the requested connection in quarantine until such feature negotiations with client 100 are verified or authenticated.

Figure 1B:
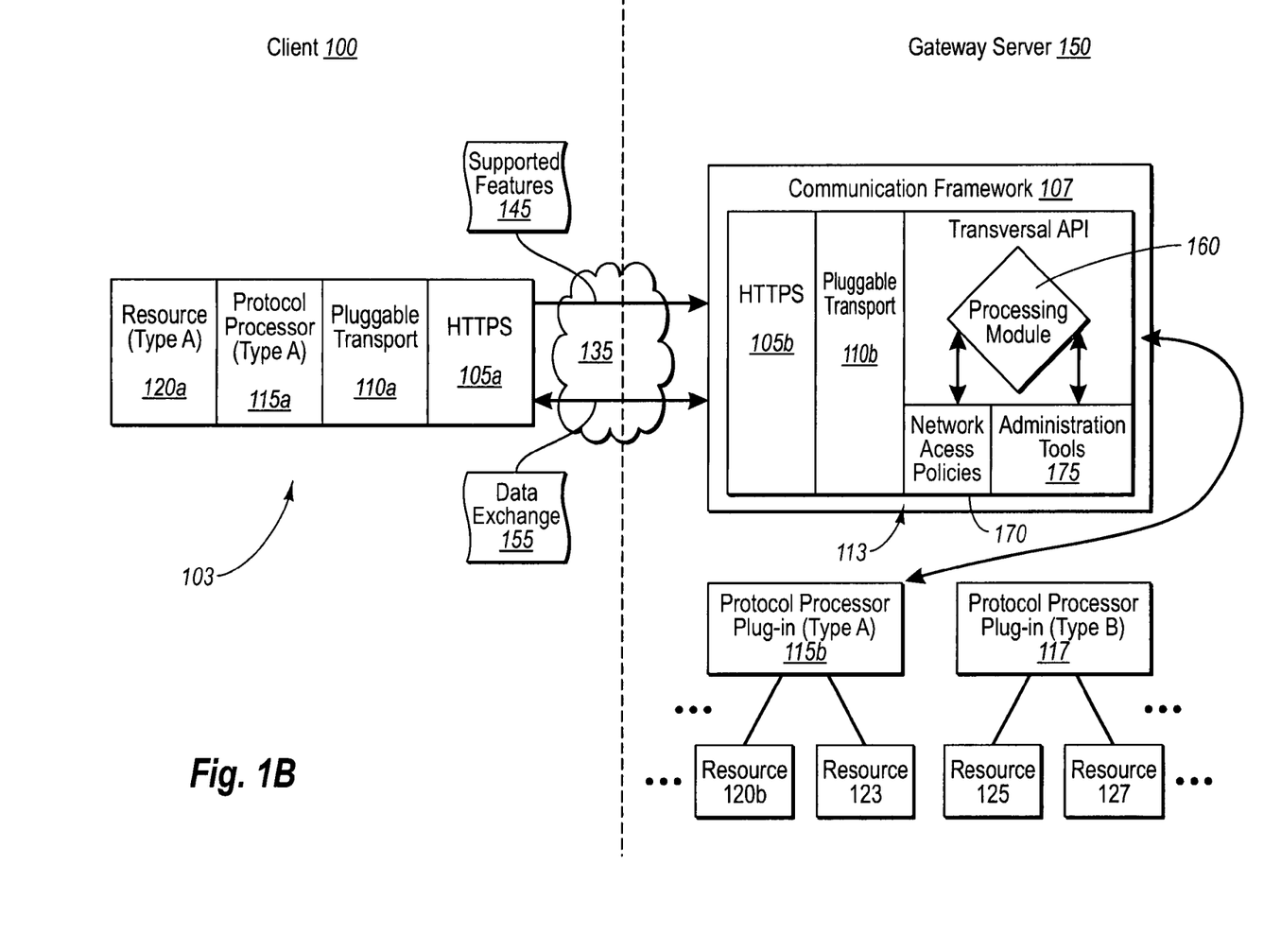
FIG. 1B illustrates an overview schematic diagram of the system shown in FIG. 1A, in which the client computer system communicates with a specified resource in accordance with an implementation of the present invention.

Client 100 then processes message 140, such as by detecting which features client 100 is running or equipped to run, and prepares a response. For example, FIG. 1B shows that client 100 replies with message 145, indicating any such identified, supported features. Traversal API 160 can then compare response 145 with information in access policy component 170 to determine whether these client-supported features are appropriate for the network connection, or for establishing a channel to the requested resource, or whether different features (or different versions of the same features) are needed. In one implementation, if different features are needed (i.e., client 100 is not updated enough, or does not have certain required features) for the connection to gateway server 150, traversal API 160 can simply drop the connection, can send an error message, or can send a message pointing to a network location where client 100 can download the feature. In other implementations, such as mentioned above, communication framework 107 simply turns off those gateway server 150 features that client 100 does not also support.

If message 145 indicates an appropriate set of features (when such features may be required), and client 100 is authorized to access the requested server-side resource, then traversal API 160 can begin to transfer the connection to an appropriate protocol processor plug-in for the resource. For example, traversal API 160 can first look at the "type" of resource being requested to determine if resource 120b requires a specific protocol processor plug-in, or if resource 120b is part of a broader class of resources. In particular, FIG. 1B shows that protocol processor plug-in 115b is associated at least with resources 120b and 123, while protocol processor plug-in 117, which is a "Type B" processor, is associated at least with resources 125 and 127. Generally, this action of determining an appropriate protocol processor plug-in can be done by reviewing the system registry, with which each protocol processor plug-in will have registered at installation.

In any event, FIG. 1B shows that traversal API 160 identifies protocol processor plug-in 115b, which is a "Type A" processor, and is associated with the requested resource 120b. Traversal API 160 then hands off control of a channel between client 100 and protocol processor plug-in 115b. As such, protocol processor plug-in 115a at client 100 and protocol processor plug-in 115b at gateway server 150 are now connected at the respective application layers of stacks 103 and 113, respectively, and thus enabled to exchange data (e.g., 155) through this channel of the connection. In particular, communication framework 107 allows one or more channels within a tunnel for the connection to a specific resource using corresponding client and gateway server protocol processor plug-ins, rather than a network connection handled by the network layers of the respective communication stacks.

Control of these channels through the connection tunnel can allow client 100 to identify any additional resources that can be accessed, as well as to create additional channels with the initially requested resource (i.e., resource 120b). For example, client 100 can create multiple channels in the connection tunnel with the same resource through communication framework 107, and can also request traversal API 160 to provide additional channels (as well as other tunnels and corresponding one or more other channels) to other resources associated with the same protocol processor plug-in for resource 120b, such as resource 123. In some implementations, client 100 can also ask communication framework 107 to identify another protocol processor plug-in (e.g., 117) pursuant to communicating with another resource (e.g., 125). In any event, connection control is governed at least in part through access policies component 170 and/or administration tools component 175 (or "tools component 175").

Generally, tools component 175 can comprise any number of interfaces (e.g. any one or more of "core API," "configuration API," "policy API," and/or "runtime status and control API"). Administration tools component 175 can also comprise any scripts, data tables, and related functions that can be accessed, for example, by an administrator of gateway server 150. For example, a network administrator that desires to affect a network policy for a certain protocol processor plug-in, or to analyze the numbers of connections through communication framework 107, can open a user interface (not shown) provided by tools component 175.

The network administrator can then monitor general Internet usage, make changes to runtime state, shut down any tunnels belonging to misbehaving users, limit the numbers of firewall traversal connections, and declare the types of encryption used to make such a connection. The network administrator can also change any of these and other network settings or policies, such as those also described throughout this specification. The network administrator can further use the interface to set which users are allowed to access which types of resources, which resources are to be available at all, when those resources can be accessed outside of the firewall, and which servers can be accessed by those users.

A developer of a protocol processor plug-in can also access these tools in component 175. In particular, the developer can write the protocol processor plug-in to access and set various default network policies for use with the protocol processor plug-in. For example, a developer of the protocol processor plug-in may design the protocol processor plug-in to interact with still another interface in administration tools 175 and set minimum resource or feature requirements. Accordingly, FIGS. 1A-1B illustrate a number of components, tools, and schematics that can be used in the context of a communication framework 107, and which are configured to provide granular, secure, and measured access to resources within a firewall setting.

Figure 2:
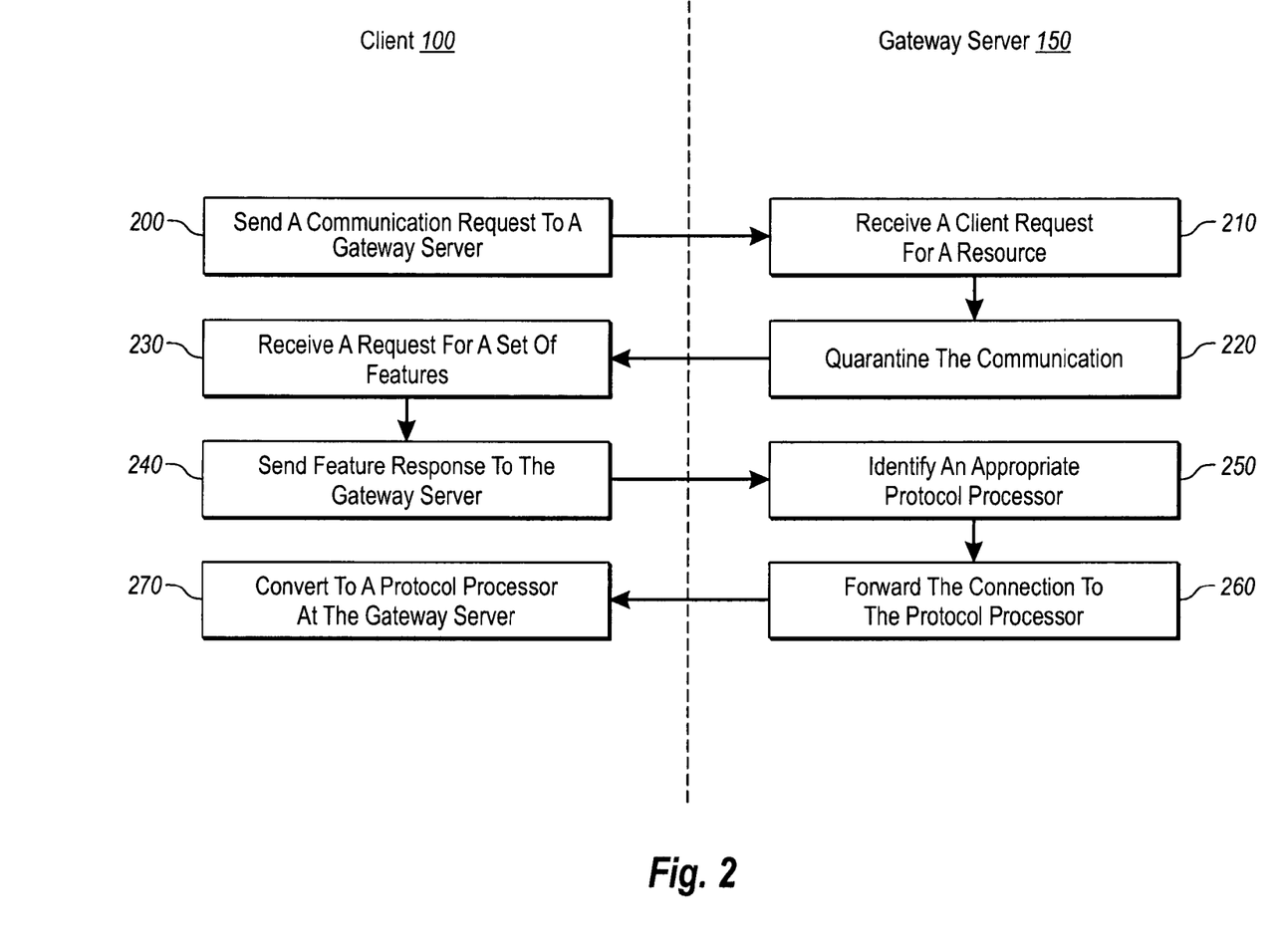
FIG. 2 illustrates flowcharts of methods from the perspectives of a client computer system and a gateway server for traversing a firewall, and for communicating with a specified resource in accordance with network policies provided by a communication framework.

Implementations of the present invention can also be described in terms of methods comprising one or more acts for accomplishing a particular result. For example, FIG. 2 illustrates a flowchart of methods from the perspective of client 100 and gateway server 150 for creating a connection (e.g., a channel) to a specific resource through a firewall. The acts of FIG. 2 are described below with respect to FIGS. 1A through 1B.

In particular, FIG. 2 illustrates that the method from the perspective of client 100 comprises an act 200 of sending a connection request to a gateway server. Act 200 includes sending a request for a connection at a gateway server, wherein the request identifies a server resource to connect with a corresponding client resource. For example, client 100 instantiates communication stack 103 with protocol processor plug-in 115a in order to access resource 120b. Client 100 then prepares and sends message 130, which includes authentication information, as well as a request to access resource 120b, and sends message 130 to gateway server 150.

In addition, FIG. 2 shows that the method from the perspective of gateway server 150 comprises an act 210 of receiving a client request for a resource. Act 210 includes receiving a client request for a client connection, wherein the client request identifies a resource with which the client would like to connect. For example, gateway server 150 receives message 130. Gateway server 150 then decodes message 130 at HTTPS layer 105b, unpacks any other protocol packaging at pluggable transport layer 110b, and evaluates any included authentication information contained therein. If the authentication information is incorrect, such as being in conflict with a network access policy, gateway server 150 can simply deny the connection. Alternatively, if the authentication information is correct, such as meeting a minimum standard (e.g., appropriate user name and password) for connecting through the firewall, gateway server 150 can quarantine the connection until a certain set of features—also in accordance with a network or resource access policy—are identified from client 100.

Thus, for example, FIG. 2 also shows that the method from the perspective of gateway server 150 comprises an act 220 of quarantining the connection. Act 220 includes quarantining a connection with the client to determine if the client has installed a minimum set of one or more features. For example, FIG. 1A shows that, upon receiving message 130, communication framework 107 sends one or more reply messages 140. Rather than necessarily grant the connection at this point, reply message 140 requests additional information to identify supported features at client 100, such as the version for protocol processor plug-in 120a, connection features that client 100 and server 150 mutually support, or any other resource components 120a (or corresponding features, feature updates, etc.) that can ultimately be used in the connection.

Accordingly, FIG. 2 illustrates that the method from the perspective of client 100 comprises act 230 of receiving a request for a minimum set of features. Act 230 includes receiving a request from the gateway server for a minimum set of one or more features supported by the client for the resource. For example, client 100 receives message 140 at communication stack 103, and processes message 140 at protocol processor plug-in 115a, such as by running any scripts, or checking any system registry information for the requested features, including any other resources or resource features requested by server 150. In particular, protocol processor plug-in 115a identifies its own feature information, or feature information for resource 120a, or feature information for another software component or resource (not shown) at client 100.

In addition, FIG. 2 illustrates that the method from the perspective of client 100 comprises an act 240 of sending a feature response to the gateway server. Act 240 includes sending a supported feature response to the gateway server, the supported feature response indicating the features supported by the client. For example, FIG. 1B shows that client 100 sends response message 145, which indicates the set of one or more features that are supported by client 100, such as that a requested software version is present.

FIG. 2 also illustrates that the method from the perspective of gateway server 150 comprises an act 250 of identifying an appropriate protocol processor plug-in. Act 250 includes identifying a protocol processor plug-in based on a resource type of the identified resource. For example, traversal API 160 identifies that protocol processor plug-in 115b is a "Type A" plug-in, and is the same type as found with protocol process 115a at client 100, and associated with requested resource 120b at gateway server 150.

FIG. 2 further illustrates that the method from the perspective of gateway server 150 comprises an act 260 of forwarding the connection to the protocol processor plug-in. Act 260 includes forwarding the connection with the client to the identified protocol processor plug-in. For example, as shown in FIG. 1B, once traversal API 160 identifies that protocol processor plug-in 115b is appropriate, and that the information provided by client 100 is in accordance with a particular resource access policy, traversal API 160 passes control of the requested connection to protocol processor plug-in 115b. Generally, this can involve establishing a tunnel—and one or more channels within the tunnel—between protocol processor 115a at client 100 and protocol processor plug-in 115b at gateway server 150. Protocol processor plug-in 115a at client 100 and protocol processor plug-in 115b at gateway server can then communicate directly at the application layers of network stacks 103 and 113 through this tunnel and corresponding one or more channels.

Thus, FIG. 2 also shows that the method from the perspective of client 100 comprises an act 270 of connecting to a protocol processor plug-in at the gateway server. Act 270 includes connecting to an application layer of a communication stack at the gateway server, such that the client resource communicates data with a protocol processor plug-in associated with the server resource. For example, now that protocol processor plug-ins 115a-b are communicating directly through the firewall, and since the connection is handed off in accordance with network policy, client 100 only gains entry through the firewall sufficient to communicate with resource 120b. Thus, client 100 does not have unfettered access to all resources behind the firewall. Nevertheless, as previously described, client 100 may be able to initiate additional channels or connections to the same resource, to different instances of the resource, or to other resources that client 100 is allowed to identify through communication framework 107.

Accordingly, the methods and schematic diagrams described above provide a number of ways in which a communication-framework 107 can provide access to specific resources using a variety of plug-ins developed by developers. In particular, communication framework 107 provides a number of access policies (network and resource), tools, and components that can be used to simplify protocol processor plug-in development and implementation. For example a developer can avoid independent development of protocol processor plug-in scripts to implement specific resource access policies, or to implement specific diagnostic tools, since those tools are already incorporated in communication framework 107. Rather, the developer only need develop a protocol processor plug-in for use at a client and a server, if the developer intends any given resource to be accessible over a firewall.

Similarly, a network administrator can avoid having to independently write new network connection access policies in many cases, since such access policies can already be found in the communication framework, and thus easily configured or enabled/disabled. The features disclosed herein, therefore, can simplify the developers' and network administrators' duties to a certain extent, and shift the burden of management to a robust communication framework.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions is and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a gateway server in a computerized environment in which a client computer system accesses a resource at the gateway server through a firewall, the gateway server providing application layer connections through a firewall, a method comprising the acts of:
   receiving a connection request from a client, wherein the connection request identifies a resource with which the client would like to connect;
   identifying, based on the resource identified in the connection request, one or more access policies from a communication framework installed at the gateway, wherein the one or more access polices are generic to the communication framework and are not designed specifically for the resource;
   quarantining a connection with the client to determine if the client has installed a minimum set of one or more features that are defined in the one or more policies;
   identifying a protocol processor plug-in based on a resource type of the identified resource, wherein the identified protocol processor plug-in handles connections to multiple resources that are of the same resource type; and
   forwarding the connection with the client to the identified protocol processor plug-in by providing control of a channel of a connection tunnel to the protocol processor plug-in at the server such that subsequent communications between the client and the resource through the channel are handled by the protocol processor plug-in independently of the communication framework.

2. The method as recited in claim 1, further comprising authenticating the client based on authentication information provided in the client request compared with the one or more access policies.

3. The method as recited in claim 1, further comprising the acts of:
   receiving a different connection request for a different resource from the client; and
   establishing a different connection channel between the client and the different resource through the same connection tunnel.

4. The method as recited in claim 1, further comprising an act of receiving a different connection request for the resource, such that multiple connections have been requested to the same resource from any of the client, or the client and one or more different clients outside of the firewall.

5. The method as recited in claim 4, further comprising an act of providing control of a different channel to the identified protocol processor plug-in with the client making the different connection request.

6. The method as recited in claim 4, further comprising the acts of:
   identifying from a granular access policy setting that the different connection request is inappropriate; and
   denying the different connection request.

7. The method as recited in claim 6, wherein the access policy comprises a network access policy for determining whether the client is authorized to connect to the server, and a resource access policy for determining whether the client is authorized to create a channel with the requested resource through the server connection.

8. The method as recited in claim 6, wherein the access policy setting comprises an indication limiting access by the client to the resource during a time of day, and wherein the different connection request is outside of the time of day.

9. The method as recited in claim 6, wherein the access policy setting comprises an indication limiting access by the client to the resource at a specific port of a resource server behind a firewall, wherein the different connection request requests a connection to the resource at the specific port of the resource server.

10. The method as recited in claim 6, wherein the access policy setting is a network access policy that limits the number of connection tunnels through the firewall at the gateway server, such that the different connection request requires creation of a new connection tunnel that exceeds the limit.

11. The method as recited in claim 6, wherein the access policy setting requires that the client request be made by a client having a smartcard, wherein the different connection request indicates that the client does not have the smartcard.

12. The method as recited in claim 6, wherein the access policy setting limits access to the same resource to a permitted class of users, wherein the different connection request originates from a different user that is not a member of the permitted class of users.

13. At a gateway server in a computerized environment in which a client computer system accesses a resource at the gateway server through a firewall, the gateway server having at least a remote procedure call layer and a secure hypertext transfer protocol layer in a communication framework, a computer program product having computer-executable instructions stored thereon that, when executed, cause one or more processes at the gateway server to perform a method comprising the following:

receiving a connection request from a client, wherein the connection request identifies a resource with which the client would like to connect;

identifying, based on the resource identified in the connection request, one or more access policies from a communication framework installed at the gateway, wherein the one or more access polices are generic to the communication framework and are not designed specifically for the resource;

quarantining a connection with the client to determine if the client has installed a minimum set of one or more features that are defined in the one or more policies;

identifying a protocol processor plug-in based on a resource type of the identified resource, wherein the identified protocol processor plug-in handles connections to multiple resources that are of the same resource type; and     forwarding the connection with the client to the identified protocol processor plug-in by providing control of a channel of a connection tunnel to the protocol processor plug-in at the server such that subsequent communications between the client and the resource through the channel are handled by the protocol processor plug-in independently of the communication framework.

14. At a gateway server in a computerized environment in which a client computer system accesses a resource at the gateway server through a firewall, the gateway server having at least a remote procedure call layer and a secure hypertext transfer protocol layer in a communication framework, a communication framework that is installed at the gateway server, the communication framework comprising:

a communication stack for interfacing between a physical boundary of a network to which the gateway server is connected and software components on the gateway server, the communication stack including a secure Hypertext Transfer Protocol (HTTPS) layer and a Remote Procedure Call layer; and     an application programming interface layered on top of the HTTPS layer that provides functionality for establishing connections between clients making requests through a firewall to connect with a resource on the gateway server, identifying an appropriate protocol processor plug-in for handling the connection to the resource, and ensuring appropriate network policies are applied to the connection, wherein the network polices are contained within the communication framework separate from the protocol processor plug-ins that handle connections to one or more resources on the gateway server, and wherein an appropriate policy is selected based on the resource to which the client requests to connect, wherein upon establishing a connection with the client, the communication framework forwards the connection to the selected protocol processor plug-in such that subsequent communications between the client and the resource are handled by the protocol processor plug-in independently of the communication framework.

15. The communication framework of claim 14, wherein the network policies comprise a network access policy for determining whether the client is authorized to connect to the gateway server, and a resource access policy for determining whether the client is authorized to create a channel with the requested resource through the established connection.

16. The communication framework of claim 14, wherein the application programming interface retrieves one or more features from the network policies upon receiving a request from a client to connect to a resource, and requires the client to prove that it implements the one or more features before creating a connection to either the gateway server or the resource.

17. The communication framework of claim 14, wherein connections between clients and resources are made at the application layer of the communication stack.

* * * * *